United States Patent
Wise

(10) Patent No.: US 7,281,750 B1
(45) Date of Patent: Oct. 16, 2007

(54) SELF-ADJUSTING MOTORCYCLE WINDSHIELD

(76) Inventor: Michael Lester Wise, 260 Walsh Rd., Lagrangeville, NY (US) 12540

(*) Notice: Subject to any disclaimer, the term of this patent is extended or adjusted under 35 U.S.C. 154(b) by 0 days.

(21) Appl. No.: 11/619,105

(22) Filed: Jan. 2, 2007

Related U.S. Application Data

(60) Provisional application No. 60/829,174, filed on Oct. 12, 2006.

(51) Int. Cl.
*B62J 17/04* (2006.01)
(52) U.S. Cl. .................... 296/78.1; 280/288.4
(58) Field of Classification Search ........... 296/84.1, 296/78.1, 89; 280/288.4
See application file for complete search history.

(56) References Cited

U.S. PATENT DOCUMENTS

| | | | |
|---|---|---|---|
| 4,830,423 A | | 5/1989 | Nebu et al. |
| 5,704,679 A | * | 1/1998 | Sodo ........................ 296/78.1 |
| 5,730,483 A | * | 3/1998 | Greger ...................... 296/78.1 |
| 5,857,727 A | * | 1/1999 | Vetter ....................... 296/78.1 |
| 6,293,606 B1 | * | 9/2001 | Jarosz et al. ............... 296/78.1 |
| 6,709,042 B2 | * | 3/2004 | Takemura et al. ......... 296/78.1 |
| 7,080,414 B1 | | 7/2006 | Montero et al. |
| 2004/0080175 A1 | * | 4/2004 | Wegener et al. ........... 296/78.1 |
| 2006/0028330 A1 | * | 2/2006 | Gallant et al. ............. 340/441 |

FOREIGN PATENT DOCUMENTS

| | | | | |
|---|---|---|---|---|
| DE | 3609595 A1 | * | 9/1987 | ............... 296/78.1 |
| JP | 402175389 A | * | 7/1999 | |

OTHER PUBLICATIONS

"Kawasaki ZZR-X Sport Touring 'concept'", metricbikes.com, printed from the internet Jun. 9, 2007.*
"Concept cars: Kawasaki ZZR", disno-art.com, printed from the internet Jun. 9, 2007.*

* cited by examiner

*Primary Examiner*—Jason S Morrow

(57) ABSTRACT

A motorcycle comprises a chassis, a windshield attached to the chassis, and a speed sensor operative to determine instantaneous speeds of the motorcycle as the motorcycle travels. In addition, the motorcycle further comprises a position table and a windshield positioning device. The position table associates windshield positions in relation to the chassis with respective speeds of the motorcycle. The windshield positioning device is operative to move the windshield to the windshield positions associated in the position table with the instantaneous speeds of the motorcycle determined by the speed sensor.

16 Claims, 2 Drawing Sheets

SELF-ADJUSTING MOTORCYCLE WINDSHIELD

CROSS-REFERENCES TO RELATED APPLICATIONS

This application claims the benefit of U.S. Provisional Application No. 60/829,174, filed Oct. 12, 2006.

FIELD OF THE INVENTION

The present invention is directed generally to motorcycles, and, more particularly, to adjustable windshields in motorcycles.

BACKGROUND OF THE INVENTION

Many modern motorcycles comprise windshields (also called windscreens) that are positioned in front of the rider. Such windshields reduce the amount of wind impacting the rider while the motorcycle is in motion, often making the riding of the motorcycle less fatiguing for the rider. Moreover, motorcycle windshields may further act to protect the rider from other elements such as flying insects, rain, and road debris.

The aerodynamics of wind impinging on a windshield change significantly as a function of the speed at which the motorcycle is traveling. As a result, many modern motorcycle manufacturers have created motorcycles with windshields that may be adjusted in height and/or angle by the rider via an electric motor connected to a rider-operated switch. The 2006-model-year BMW K1200GT and Honda ST1300 ABS motorcycles, for example, comprise such electrically adjustable windshields.

A rider on one of these conventional types of motorcycles may desire to frequently adjust the position of the windshield as the rider's speed changes. The rider may, for example, wish to adjust the position of the windshield to have some amount of wind impinging on the rider's body during slow travel to aid in cooling the rider. However, at higher speed, this same windshield position may allow so much wind to impinge on the rider that the rider becomes uncomfortable or fatigued. As a result, the rider will desire to manipulate the position of the windshield as the rider's speed changes. Unfortunately, such an operation may need to be performed frequently as the motorcycle speed changes due to, for example, road conditions or traffic. What is more, such an operation, when performed through a rider-operated switch, may be distracting to the rider. The moving of a windshield in the conventional manner may, as a result, increase the rider's workload and reduce rider safety.

As a result, there is a need for a motorcycle windshield that can be adjusted for varying speed conditions without requiring that the rider frequently operate a manual switch.

BRIEF SUMMARY OF THE INVENTION

Embodiments of the present invention address the above-identified need by providing a motorcycle that comprises a windshield that can be adjusted for varying speed conditions without requiring that the rider frequently operate a manual switch.

In accordance with an aspect of the invention, a motorcycle comprises a chassis, a windshield attached to the chassis, and a speed sensor operative to determine instantaneous speeds of the motorcycle as the motorcycle travels. In addition, the motorcycle further comprises a position table and a windshield positioning device. The position table associates windshield positions in relation to the chassis with respective speeds of the motorcycle. The windshield positioning device is operative to move the windshield to the windshield positions associated in the position table with the instantaneous speeds of the motorcycle determined by the speed sensor.

In accordance with one of the above-identified embodiments of the invention, a motorcycle is operative to travel at different speeds. The motorcycle comprises a chassis, a windshield attached to the chassis, and a speed sensor operative to determine the present speed of the motorcycle. In addition, the motorcycle comprises a motor that is operative to adjust the position of the windshield (e.g., height and angle) in relation to the chassis, and a position table. The position table relates preferred windshield positions to different speeds. As the motorcycle travels, the motor changes the position of the windshield as a function of the present speed of the motorcycle in accordance with the position table. Advantageously, this allows the windshield to be automatically repositioned as the motorcycle changes speed.

These and other features and advantages of the present invention will become apparent from the following detailed description which is to be read in conjunction with the accompanying drawings.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

The term "motorcycle" as used herein is intended to encompass any two-wheeled vehicle powered by an engine and/or motor.

Figure 1:
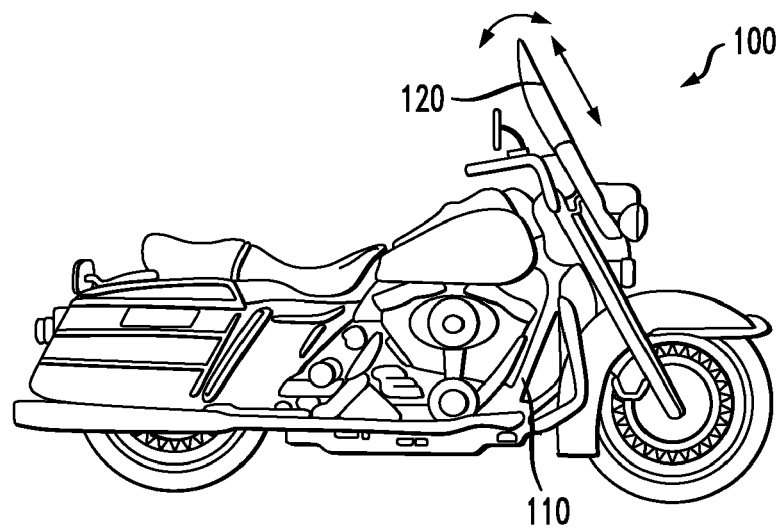
FIG. 1 shows a perspective view of a motorcycle in accordance with an illustrative embodiment of the invention.

FIG. 1 shows a motorcycle 100 in accordance with an illustrative embodiment of the invention. The motorcycle comprises a chassis 110. Coupled to the chassis is a windshield 120. The motorcycle also comprises a number of other elements that will be familiar to one skilled in the art but are not explicitly labeled in FIG. 1 because they are not necessary for the understanding of the subject matter of the invention. These other elements include an engine, suspension, transmission, wheels, tires, brakes, instruments, electrical system, lights, seat and rider controls.

Figure 2:
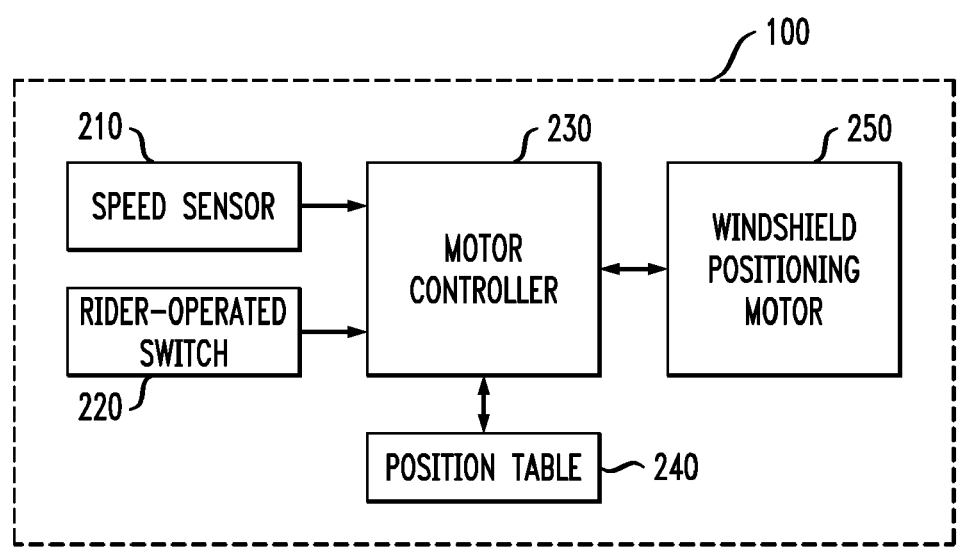
FIG. 2 shows a block diagram of a windshield control apparatus in the FIG. 1 motorcycle embodiment.

The windshield 120 is operative to be configured into various different positions. Each windshield position comprises some combination of height and angle relative to the chassis 110. FIG. 2 shows a block diagram of elements within the motorcycle 100 associated with the positioning of the windshield. The motorcycle includes a speed sensor 210, a rider-operated switch 220, a motor controller 230, a position table 240, and a windshield positioning motor 250.

The speed sensor 210 provides an indication to the motor controller 230 of the present speed (i.e., the instantaneous speed) of the motorcycle. The speed sensor may be, for example, a conventional analog or digital speedometer or, alternatively, a global positioning system operative to determine the motorcycle's speed. The motor controller, in turn, is preferably an electronic component that controls the windshield positioning motor 250 in accordance with the rider-operated switch 220 or the position table 240, described in greater detail below. Finally, the windshield positioning motor is preferably an electric motor coupled to the windshield 120 and operative to move the windshield in both height and angle in relation to the chassis 110.

One skilled in the art will recognize how an electric motor may be implemented in the motorcycle 100 to move the windshield 120. As stated before, such electric motors are conventionally used in several modern, commercially-available motorcycles. The windshield positioning motor 250 may, for example, comprise a digitally controlled stepper motor. The motor controller 230, in turn, will preferably comprise conventional digital circuitry operative to send electrical signals to the electromagnets in the stepper motor and allow the stepper motor to move in a precise, reproducible manner. The motor controller may, for example, comprise a digital microcontroller.

Figures 3, 4:
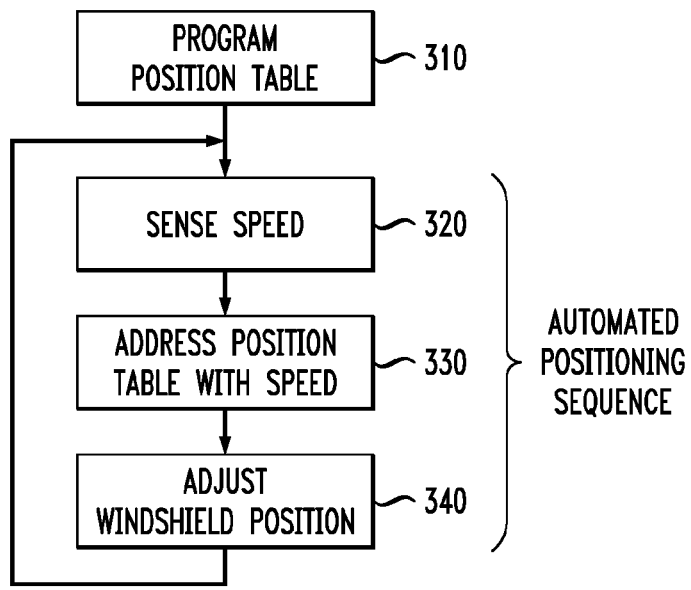
FIG. 3 shows a flow chart for positioning a windshield in the FIG. 1 motorcycle embodiment.
FIG. 4 shows an illustrative position table in the FIG. 1 motorcycle embodiment.

FIG. 3 shows an illustrative process flow that allows the elements in FIG. 2 to position the windshield 120 in accordance with aspects of this invention. Step 310 comprises programming the position table 240. In such a step, the rider preferably rides the motorcycle 100 at different speeds and adjusts the windshield to the rider's preferred positions at the different speeds using the rider-operated switch 220. The rider operated-switch, in turn, is connected to the motor controller 230 which commands the windshield positioning motor 250 to move the windshield in accordance with the rider's inputs.

As the rider is positioning the windshield 120 at various speeds via the rider-operated switch 220, a preferred windshield position is associated by the motor controller 230 with the various speeds returned by the speed sensor 210. These preferred windshield positions and associated speeds are stored in the position table 240. FIG. 4 shows an example of various entries in the position table (where a given windshield position is represented by a letter). The table, may for example, record the preferred position of the windshield at every 2 mile-per-hour increment, although this is entirely arbitrary and other increments would still come within the scope of the invention. The position table, itself, may be integrated in the motor controller or may be a discrete device. The position table, may, for example, be implemented in a conventional Electrically Erasable Programmable Read-Only Memory (EEPROM), flash memory or random-access memory (RAM), all of which will be familiar to one skilled in the art.

Once programmed in this way, the motorcycle 100 enters a mode in which the windshield 120 is automatically adjusted to the rider's preferred positions as the motorcycle changes speed without the rider having to move the windshield via the rider-operated switch 220. This automated positioning sequence is represented in FIG. 3 by steps 320-340. In step 320, the speed sensor 210 measures the speed at which the motorcycle is presently traveling and outputs that speed to the motor controller 230. In step 330, the motor controller addresses the position table 240 with the present speed. The position table, in turn, returns the preferred windshield position associated with the speed entry nearest the present speed. Finally, in step 340, the motor controller commands the windshield positioning motor 250 to adjust the windshield to the position returned by the position table.

Accordingly, once in the automated positioning sequence, the rider is no longer required to operate the rider-operated switch 220 in order to maintain the windshield 120 at the rider's preferred positions as the rider changes speed. The rider is, therefore, left to concentrate on other aspects of riding the motorcycle while enjoying the benefits of an adjustable windshield.

The sequence of steps 320-340 is preferably repeated as long as the motorcycle 100 is in operation. If, however, during this automated sequence, the rider decides that a windshield position different from that programmed into the position table 240 is desired, the rider may preferably reenter the programming step 310 by, for example, merely pushing the rider-operated switch 220. Once back in step 310, the rider may change some or all of the entries in the position table before reentering the automated positioning sequence (i.e., steps 320-340).

Optionally, the position table 240 may have separate entries for more than one rider. Advantageously, this would allow two or more riders to ride the same motorcycle and have preferred windshield entries that are customized to each rider's preferences.

It is to be understood that, although illustrative embodiments of the present invention have been described herein with reference to the accompanying figures, the invention is not limited to those precise embodiments. One skilled in the art will recognize various other changes and modifications that may be made without departing from the scope of the appended claims.

What is claimed is:

1. A motorcycle, the motorcycle comprising:
   a chassis;
   a windshield, the windshield attached to the chassis;
   a speed sensor, the speed sensor operative to determine instantaneous speeds of the motorcycle as the motorcycle travels;
   a position table, the position table associating windshield positions in relation to the chassis with respective speeds of the motorcycle; and
   a windshield positioning device, the windshield positioning device operative to move the windshield to the windshield positions associated in the position table with the instantaneous speeds of the motorcycle determined by the speed sensor;
   wherein a rider of the motorcycle at least partially programs the position table.

2. The motorcycle of claim 1, wherein a rider of the motorcycle at least partially programs the position table using a user-operated control on the motorcycle, the user-operated control operative to cause the windshield positioning device to move the windshield.

3. The motorcycle of claim 1, wherein the speed sensor comprises at least one of a speedometer and a global positioning system device.

4. The motorcycle of claim 1, wherein the motorcycle further comprises a memory, the memory operative to store the position table.

5. The motorcycle of claim 4, wherein the memory comprises a read-only memory, a flash memory, or a random-access memory.

6. The motorcycle of claim 1, wherein the windshield positioning device comprises a motor.

7. The motorcycle of claim 6, wherein the motor comprises a digitally controlled stepper motor.

8. The motorcycle of claim 6, wherein the motor is at least partially controlled by a digital microcontroller.

9. The motorcycle of claim 1, wherein the windshield positioning device is operative to change at least one of a height and an angle of the windshield in relation to the chassis.

10. The motorcycle of claim 1, wherein the position table is operative to store entries associated with a first rider and entries associated with a second rider.

11. An apparatus for adjusting the position of a windshield attached to a chassis of a motorcycle, the motorcycle comprising a speed sensor operative to determine instantaneous speeds of the motorcycle as the motorcycle travels, the apparatus comprising:

a position table, the position table associating windshield positions in relation to the chassis with respective speeds of the motorcycle; and a windshield positioning device, the windshield positioning device operative to move the windshield to the windshield positions associated in the position table with the instantaneous speeds of the motorcycle determined by the speed sensor;

wherein a rider of the motorcycle at least partially programs the position table.

12. The apparatus of claim 11, wherein a rider of the motorcycle at least partially programs the position table using a user-operated control on the motorcycle, the user-operated control operative to cause the windshield positioning device to move the windshield.

13. The apparatus of claim 11, wherein the windshield positioning device is operative to change at least one of a height and an angle of the windshield in relation to the chassis.

14. A method of positioning a windshield attached to a chassis of a motorcycle, the motorcycle comprising a speed sensor operative to determine instantaneous speeds of the motorcycle as the motorcycle travels, the method comprising the steps of:

associating in a position table windshield positions in relation to the chassis with respective speeds of the motorcycle; and moving the windshield to the windshield positions associated in the position table with the instantaneous speeds of the motorcycle determined by the speed sensor;

wherein the step of associating windshield positions in relation to the chassis with respective speeds of the motorcycle in the position table is at least partially performed by a rider of the motorcycle.

15. The method of claim 14, wherein the step of associating windshield positions in relation to the chassis with respective speeds of the motorcycle in the position table is at least partially performed by a rider of the motorcycle using a user-operated control on the motorcycle, the user-operated control operative to cause the windshield positioning device to move the windshield.

16. The method of claim 14, wherein the step of moving the windshield to the windshield positions associated in the position table with the instantaneous speeds of the motorcycle determined by the speed sensor comprises changing at least one of a height and an angle of the windshield in relation to the chassis.

* * * * *